(12) United States Patent
Yang et al.

(10) Patent No.: US 8,930,033 B2
(45) Date of Patent: Jan. 6, 2015

(54) DEMAND RESPONSE METHOD, COMPUTER-READABLE MEDIUM AND SYSTEM

(75) Inventors: Jang Beom Yang, Gwang-ju (KR); Jung Won Park, Gwangju (KR); Seong Wook Jeong, Gwangju-si (KR); Chang Hern Lee, Gwangju (KR); Seong Chan Gim, Gwangju (KR); Young Ho Jang, Gwangju (KR); Jae Min Lim, Ayang-si (KR); Sung Ho Cho, Gwangju (KR); Sun Il Jin, Yongin-si (KR); Chang Ho Son, Hwaseong-si (KR); Young Jin Baek, Changwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 851 days.

(21) Appl. No.: 12/929,803

(22) Filed: Feb. 16, 2011

(65) Prior Publication Data

US 2011/0208369 A1    Aug. 25, 2011

(30) Foreign Application Priority Data

Feb. 19, 2010   (KR) ........................ 10-2010-0015403

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 3/14 | (2006.01) |

(52) U.S. Cl.
CPC ............... *H02J 3/14* (2013.01); *Y02B 70/3225* (2013.01); *Y04S 20/222* (2013.01); *Y02B 70/3266* (2013.01); *Y04S 20/224* (2013.01); *Y04S 20/242* (2013.01)
USPC ........................................... 700/286; 700/295

(58) Field of Classification Search
CPC ........ H02J 3/14; Y04S 20/222; Y04S 20/224; Y02B 70/3225
USPC ................................... 700/295, 286; 705/412
See application file for complete search history.

(56) References Cited

U.S. PATENT DOCUMENTS 8,131,403 B2 * 3/2012 Forbes et al. ................. 700/295
8,583,520 B1 * 11/2013 Forbes, Jr. ....................... 705/34

(Continued)

FOREIGN PATENT DOCUMENTS

| JP | 2003-153441 | 5/2003 |
|---|---|---|
| JP | 2007-129873 | 5/2007 |

(Continued)

OTHER PUBLICATIONS

High Tech fridge; 3 pages; caption for article posted on the CNET website on Jul. 16, 2009; printed from Internet on Feb. 8, 2014.*

*Primary Examiner* — Ronald Hartman, Jr.
(74) *Attorney, Agent, or Firm* — Staas & Halsey LLP

(57) ABSTRACT

A demand response (DR) system, computer-readable medium and method are disclosed. The DR system controls a high-power-consumption load to be pre-operated or post-operated in a low-power-rate interval instead of a high-power-rate interval, and reduces an amount of power consumption required for a high-power-rate interval, resulting in reduction of power rates. In addition, limitation to household appliance operation is minimized, to greatly reduce inconvenience of a user.

12 Claims, 11 Drawing Sheets

(56) References Cited

U.S. PATENT DOCUMENTS

| | | | |
|---|---|---|---|
| 2004/0215529 A1* | 10/2004 | Foster et al. | 705/26 |
| 2004/0220869 A1* | 11/2004 | Perera | 705/37 |
| 2008/0177678 A1* | 7/2008 | Di Martini et al. | 705/412 |
| 2009/0295594 A1* | 12/2009 | Yoon | 340/825.36 |
| 2011/0196546 A1* | 8/2011 | Muller et al. | 700/295 |
| 2011/0231320 A1* | 9/2011 | Irving | 705/80 |
| 2012/0083930 A1* | 4/2012 | Ilic et al. | 700/287 |
| 2012/0245751 A1* | 9/2012 | Gow et al. | 700/291 |
| 2013/0144451 A1* | 6/2013 | Kumar et al. | 700/291 |
| 2013/0231790 A1* | 9/2013 | Shao | 700/291 |

FOREIGN PATENT DOCUMENTS

| | | |
|---|---|---|
| JP | 2008-236913 | 10/2008 |
| JP | 2009-240054 | 10/2009 |

\* cited by examiner

FIG. 9

| LOAD | PRIORITY | QUALITY INFLUENCE | MAXIMUM DELAY TIME | DELAY STANDBY TIME | POWER CONSUMPTION |
|---|---|---|---|---|---|
| LOAD1 | 2 | 10% | 30 MINUTE | 60 MINUTE | 10W |
| LOAD2 | 4 | 30% | 60 MINUTE | 60 MINUTE | 10W |
| LOAD3 | 3 | 20% | 40 MINUTE | 60 MINUTE | 10W |
| LOAD4 | 1 | 5% | 120 MINUTE | 60 MINUTE | 10W |
| LOAD5 | 5 | 35% | 20 MINUTE | 60 MINUTE | 10W |

DEMAND RESPONSE METHOD, COMPUTER-READABLE MEDIUM AND SYSTEM

CROSS-REFERENCE TO RELATED APPLICATIONS

This application claims the benefit of Korean Patent Application No. 10-2010-0015403, filed on Feb. 19, 2010 in the Korean Intellectual Property Office, the disclosure of which is incorporated herein by reference.

BACKGROUND

1. Field

Example embodiments relate to a demand response method, a computer-readable medium and system reducing peak power rates when power rates are high to reduce electricity bills.

2. Description of the Related Art

Generally, it is necessary for a power system to balance demand and supply. This requirement of the power system is of importance to rational utilization of limited energy resources.

For the aforementioned purposes, demand management is a focus of attention, and a number of studies are underway into demand response (DR) about the developed demand management formats.

The demand response (DR) can be defined as a variation of consumption format depending on variation in power rates. In addition, the demand response (DR) may be defined as incentive payment to restrict the use of electricity when power rates are high.

The demand response (DR) may further include an intentional procedure for changing a consumption behavior in the same manner as in the aforementioned incentive payment. By the aforementioned two methods, the demand response (DR) of consumers may be derived. Consumers can reduce the amount of power consumption during a specific time interval of high or expensive power rates even if they experience inconvenience during the specific time interval. For example, the consumer may temporarily stop an air-conditioner in mid-summer to reduce the power consumption when power rates are high.

However, a conventional DR system has proposed an easy and simple control scheme dependent upon cost or price information. That is, the conventional DR system has been designed to limit the operation of household appliances in response to power rates, which may cause user inconvenience.

SUMMARY

Therefore, it is an aspect of the example embodiments to provide a demand response method, computer-readable medium and system that reduce power consumption when power rates are high through load distribution, thereby changing an operation start time point of load to reduce power rates.

The foregoing and/or other aspects are achieved by providing a demand response method including receiving, by a processor, electricity demand information, extracting, by the processor, an electricity demand pattern in response to the received electricity demand information, dividing, by the processor, a unit interval into a high-power-rate interval and a low-power-rate interval in response to the extracted electricity demand pattern, estimating, by the processor, an estimated operation start time point of a load, and changing, by the processor, if the estimated operation time point is in the high-power-rate interval, an operation start time point of the load to any time of the low-power-rate interval to operate the load operation in the low-power-rate interval.

In the estimating of the estimated operation time point of the load, the load may be a high-power-consumption load.

The load may be any one of a defrosting heater of a refrigerator, a defrosting heater of an air-conditioner, or a heater of a washing machine.

The changing of the operation time of the load to any time of the low-power-rate interval may include determining, if the estimated operation time point is in the high-power-rate interval, whether a limit delay time point at which the load operation is maximally delayed is contained in the high-power-rate interval, and performing a pre-operation for moving the operation time point of the load forward or a post-operation for moving the operation time point of the load backward according to the determined result to allow the operation time point of the load to move from the high-power-rate interval.

The performing of the pre-operation or the post-operation may include, if a limit delay time point of the load is contained in the high-power-rate interval, shifting the operation time point of the load to the low-power-rate interval located before the high-power-rate interval, and if the limit delay time point of the load is not contained in the high-power-rate interval, delaying the operation time point of the load toward a low-power-rate interval located after the high-power-rate interval.

The foregoing and/or other aspects are achieved by providing a demand response method including receiving, by a processor, electricity demand information, extracting, by the processor, an electricity demand pattern in response to the received electricity demand information, dividing, by the processor, a unit interval into a high-power-rate interval and a low-power-rate interval in response to the extracted electricity demand pattern, and performing, by the processor, at least one of a pre-cooling operation wherein a household appliance starts a cooling operation in a low-power-rate interval before the high-power-rate interval, or a post-cooling operation wherein a start time of a final-cycle cooling operation performed in the high-power-rate interval is delayed to a low-power-rate interval located after the high-power-rate interval.

In the performing of the pre-cooling operation, the pre-cooling operation may be compulsorily cooled to a specific temperature lower than a predetermined temperature of a previous-cycle cooling operation.

The foregoing and/or other aspects are achieved by providing a demand response system including a receiving unit to receive electricity demand information, an electricity demand recording unit to record information on electricity demand amount in response to the received electricity demand information, an electricity demand pattern extracting unit to extract an electricity demand pattern from the electricity demand amount recorded in the electricity demand recording unit, and a demand response (DR) controller to compare an electricity demand amount of an electricity demand pattern extracted from the electricity demand pattern extracting unit with a predetermined electricity demand amount, divide a unit interval into a high-power-rate interval and a low-power-rate interval, estimate an estimated operation time point of a load, and shift a start time point of the load operation to the low-power-rate interval when the estimated operation time point is in the high-power-rate interval to start the load operation in the low-power-rate interval.

The load may be any one of a defrosting heater of a refrigerator, a defrosting heater of an air-conditioner, or a heater of a washing machine.

The DR controller may determine, if the estimated operation time point falls within the high-power-rate interval, whether a limit delay time point at which the load operation is maximally delayed falls within the high-power-rate interval, move the operation time point of the load toward the low-power-rate interval located before the high-power-rate interval when the limit delay time point of the load falls within the high-power-rate interval, and delay the operation time point of the load toward a low-power-rate interval located after the high-power-rate interval when the limit delay time point of the load does not fall within the high-power-rate interval.

The foregoing and/or other aspects are achieved by providing a demand response method including receiving, by a processor, power rate information, establishing, by the processor, a plurality of demand response (DR) levels having different power rates and different allowed amounts of power in response to the power rate information, recognizing, by the processor, a current DR level, measuring, by the processor, an amount of power consumed by a household appliance, comparing, by the processor, the measured power amount with an allowed power amount corresponding to the recognized DR level, and delaying, by the processor, if the current power amount is equal to or greater than the allowed power amount corresponding to the current DR level, a load operation to an interval of a DR level lower than a current DR level until the power amount reaches the allowed power amount corresponding to the current DR level.

The establishing of the plurality of DR levels may include establishing a plurality of DR levels having different power rates and different allowed power amounts on a basis of a minimum power rate and a maximum power rate of the received power rate information.

In the delaying of the load operation, the load may include a plurality of loads having different priorities, and operation time points of individual loads may be sequentially delayed in ascending numerical order of priorities toward a low-DR-level interval having a DR level lower than the current DR level.

The foregoing and/or other aspects are achieved by providing a demand response system including a receiving unit to receive power rate information, a demand response (DR) level setup unit to establish a plurality of DR levels having different power rates and different allowed power amounts in response to the received power rate information, and a DR controller to recognize a current DR level, measure an amount of power consumed by a household appliance, compare the measured power amount with an allowed power amount corresponding to the recognized DR level, delay, when the power amount is equal to or higher than the allowed power amount corresponding to the current DR level, a load operation toward an interval of a DR level lower than a current DR level until the power amount reaches the allowed power amount corresponding to the current DR level.

The load may include a plurality of loads having different priorities, and the DR controller may delay an operation time point of each load in ascending numerical order of priorities toward a low-DR-level interval having a DR level lower than the current DR level.

The foregoing and/or other aspects are achieved by providing a demand response method including receiving, by a processor, power rate information, establishing, by the processor, a plurality of demand response (DR) levels having different power rates in response to the received power rate information, recognizing, by the processor, a current DR level, determining, by the processor, whether the current DR level is equal to or higher than a predetermined DR level, and delaying, by the processor, if the current DR level is equal to or higher than the predetermined DR level, a start time point of a load to be performed in the current-DR-level interval toward a low-DR-level interval having a low DR level.

The foregoing and/or other aspects are achieved by providing a demand response system including a receiving unit to receive power rate information, a demand response (DR) level setup unit to establish a plurality of DR levels having different power rates in response to the received power rate information, and a DR controller to recognize a current DR level, determine whether the current DR level is equal to or higher than a predetermined DR level, and delay, if the current DR level is equal to or higher than the predetermined DR level, a start time point of a load to be performed in the current-DR-level interval to a low-DR-level interval having a low DR level.

The foregoing and/or other aspects are achieved by providing a method, including interpreting, by a processor, electricity demand information to generate an electricity demand pattern, determining, by the processor, demand rate levels to generate a high power rate time period and a low power rate time period by using the electricity demand pattern and modifying, by the processor, an electrical appliance operation time forward or backward in time to the low power rate time period if the electrical appliance operation time is preset in the high power rate time period, where the modifying is dependent upon at least one of a maximum delay time, a priority of an electrical appliance and an influence on quality.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which:

FIG. 9 shows priority, quality influence, maximum delay time, delay standby time, and power consumption of respective loads of a household appliance stored in a storage unit shown in FIG. 8.

DETAILED DESCRIPTION

Figure 1:
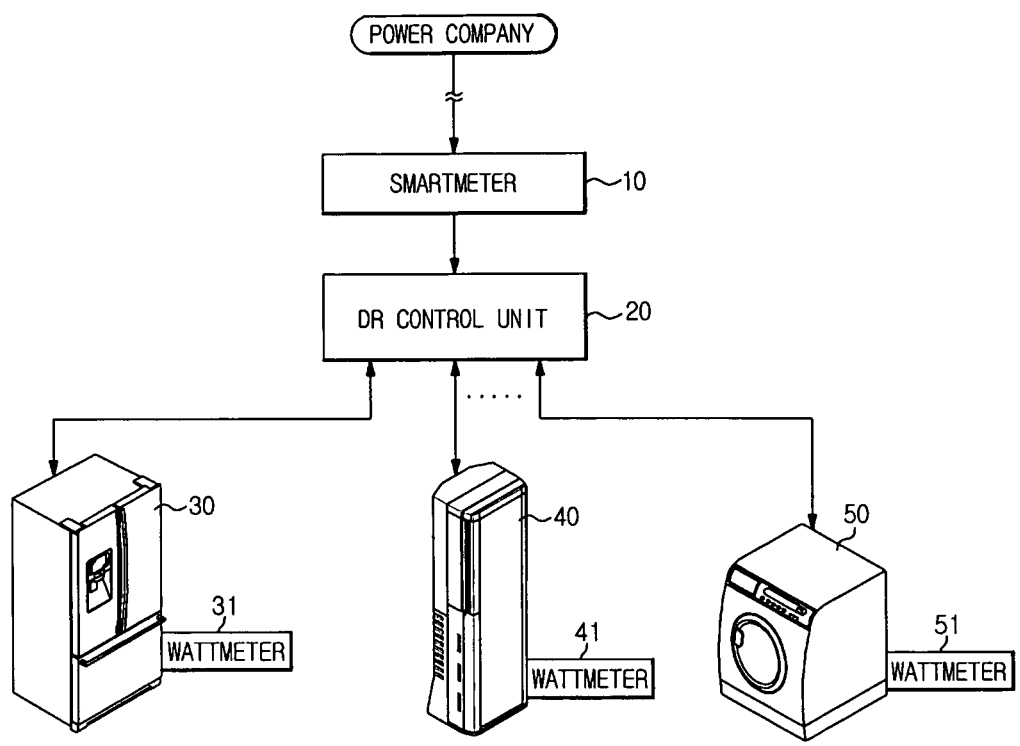
FIG. 1 is a configuration diagram illustrating a demand response (DR) system according to example embodiments.

Reference will now be made in detail to the embodiments, examples of which are illustrated in the accompanying drawings, wherein like reference numerals refer to like elements throughout.

FIG. 1 is a configuration diagram illustrating a demand response (DR) system according to example embodiments.

Referring to FIG. 1, the DR system may include a smartmeter 10 installed in a home to transmit and receive information to and from a power company; a DR control unit 20 to receive information about electric demand or electric charges from the smartmeter 10; and respective household appliances 30, 40 and 50 connected to the DR control unit 20 over a network.

Each household appliance 30, 40 or 50 may perform a desired function using power received through a power line.

The amount of power consumed by each household appliance 30, 40 or 50 may be measured by a wattmeter 31, 41 or 51 installed in the household appliance 30, 40 or 50. Each wattmeter 31, 41 or 51 may measure the actual power consumption of the household appliance 30, 40 or 50. Each wattmeter 30, 40 or 50 may be properly controlled by power information, and information about the amount of power used by a current household appliance may be transmitted to the DR control unit 20.

The household appliance 30, 40 or 50 may include all kinds of electric household appliances, for example, a refrigerator, an air-conditioner, a washing machine, a television, an official machine, etc.

The DR controller 50 may receive information about electricity demand or electric charges, etc, determine a DR level according to the received information, and transmit the determined DR level to each of the household appliances 30, 40 and 50.

In addition, the DR control unit 20 may record electricity demand information received from the power company through the smartmeter 10 at intervals of a predetermined time (i.e., every unit time), and extract an electricity demand pattern using an average electricity demand for each time zone during a predetermined period. The DR control unit 20 may classify a time interval depending on the electricity demand pattern into a high-power-rate assessment interval and a low-power-rate assessment interval on the basis of a predetermined electricity demand amount.

Figure 2:
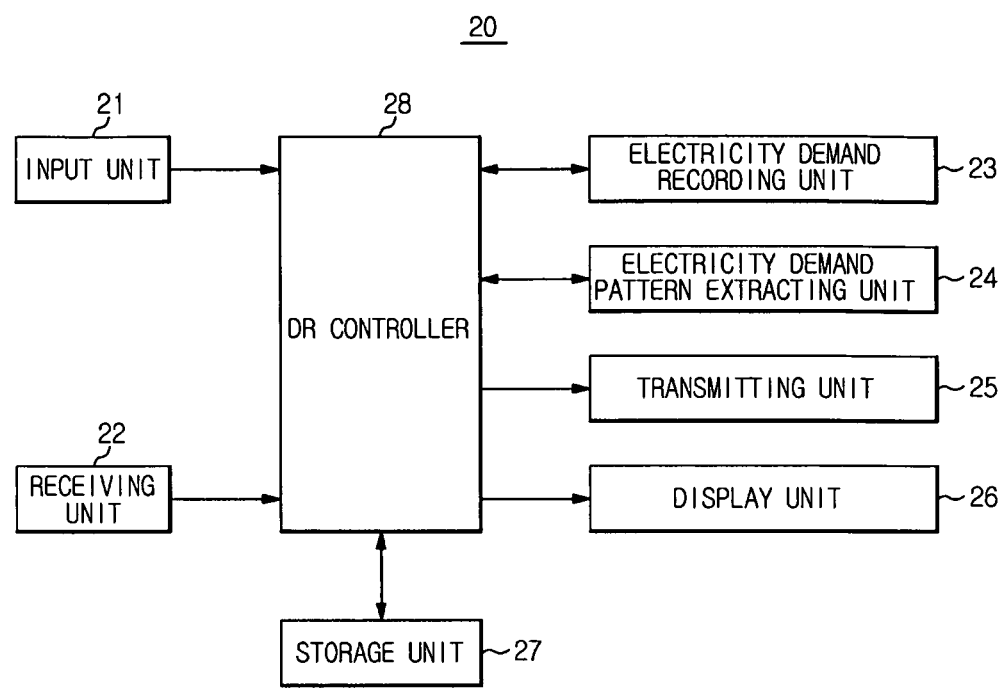
FIG. 2 is a control block diagram illustrating a DR controller for use in a DR system according to example embodiments.

FIG. 2 is a control block diagram illustrating a DR control unit for use in a DR system according to example embodiments.

A detailed description of the DR control unit 20 shown in FIG. 1 will be described with reference to FIG. 2.

Referring to FIG. 2, the DR control unit 20 may include a DR controller 28, an input unit 21, a receiving unit 22, an electricity demand recording unit 23, an electricity demand pattern extracting unit 24, a transmitting unit 25, a display unit 26 and a storage unit 27.

The input unit 21, may be for example, a keypad, a keyboard, a joystick, a touchpad, a button, etc., and may be used as an interface unit allowing a user to enter a desired command.

Specifically, the input unit 21 may be integrated with the display unit 26, and may be a touchscreen.

The receiving unit 22 may receive electricity demand information from the smartmeter 10, and receive various kinds of information from each household appliance 30, 40 or 50.

The electricity demand recording unit 23 may record information about the electricity demand amount received from the smartmeter 10 at intervals of a predetermined unit time. In particular, the electricity demand recording unit 23 may record information about the accumulated electricity demand amount used during the unit time. For example, assuming that the unit time is set to one hour, the electricity demand amount may be measured and recorded 24 times each day.

The electricity demand pattern extracting unit 24 may extract the electricity demand pattern from the electricity demand amount recorded in the electricity demand recording unit 23. The electricity demand pattern extracting unit 24 may calculate the electricity demand amount at intervals of a predetermined time (e.g., every second) and the electricity demand pattern extracting unit 24 may make out the electricity demand pattern. The electricity demand pattern may be denoted by an electricity demand amount varying with the lapse of a unit time within a pattern period. The pattern period may be set to any of one day, one week, one month, one year, etc.

In one example of calculating the electricity demand pattern using electricity demand amount data collected over a predetermined time interval, the unit time may be set to one hour and a pattern period may be set to one day. An average of all the daily electricity demand amounts may be calculated for each unit time of the pattern period, and the electricity demand pattern may be obtained.

For example, the electricity demand amount data measured between midnight and 1 o'clock (1AM) for each day may be averaged to obtain the electricity demand amount of the 1 o'clock (1AM), the electricity demand amount data measured to 1 (1AM) or 2 o'clock (2AM) for each day is averaged to obtain the electricity demand amount of the 2 o'clock. In this way, the electricity demand pattern extracting unit 24 may calculate the average electricity demand amount for each unit time of the pattern period.

Figure 3:
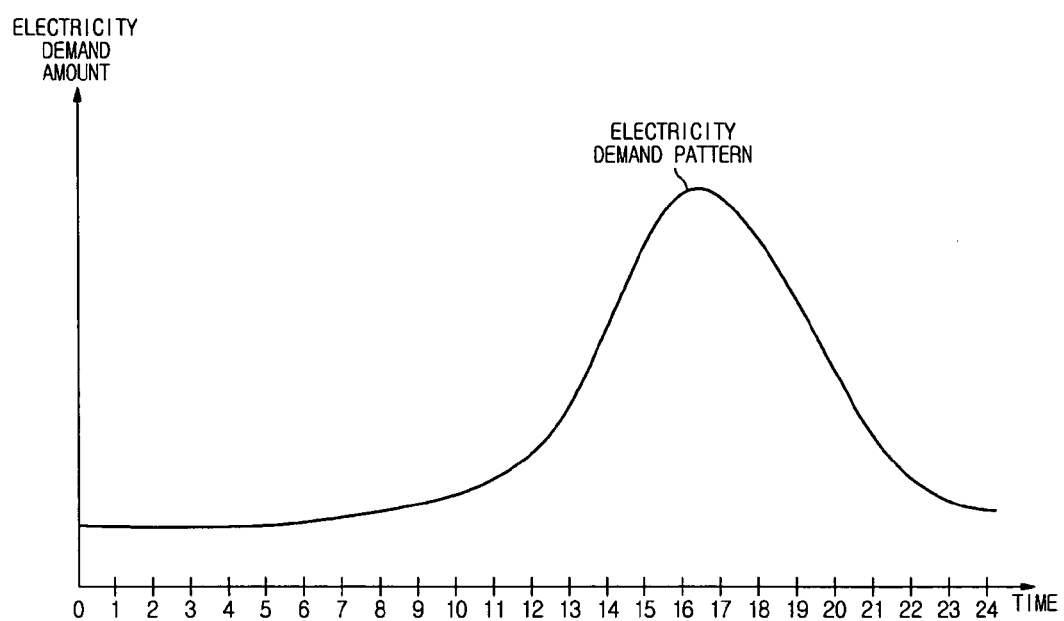
FIG. 3 is a graph illustrating an electric demand pattern for use in a DR system according to example embodiments.

The graph shown in FIG. 3 may show the electricity demand pattern. In addition, the electric demand pattern may be indicated by either the power rates in response to the lapse of a unit time or may also be denoted by different DR levels having different power rates.

The transmitting unit 35 may transmit various kinds of information to the individual household appliances 30, 40 and 50.

The display unit 26 may visually indicate operations of the DR control unit 20, or may display cost or rate information varying with the electricity demand pattern.

The storage unit 27 may store the electricity demand pattern extracted from the electricity demand pattern extracting unit 24, as well as various kinds of information.

The DR controller 28 may control individual elements of the DR control unit 20.

The DR controller 28 may receive information about the daily electricity demand amount from the smartmeter 10, and record the received information in the electricity demand recording unit 23.

In addition, the DR controller 28 may calculate an average for each time interval during the predetermined time interval in association with a daily electricity demand amount recorded in the electricity demand recording unit 23 using the electricity demand pattern extracting unit 24, to allow the electricity demand pattern extracting unit 24 to extract the electricity demand pattern. The DR controller 28 may apply a predetermined electricity demand amount for identifying each time interval to the extracted electricity demand pattern, to allow the DR controller 28 to classify a time interval in response to the electricity demand pattern into a high-power-rate assessment interval and a low-power-rate assessment interval.

That is, the DR controller 28 may determine a time interval in which the electricity demand amount of the electricity demand pattern is equal to or higher than a predetermined electricity demand amount to be a high-power-rate assessment interval, and determine another time interval in which the electricity demand amount of the electricity demand pattern is less than the predetermined electricity demand amount to be a low-power-rate assessment interval.

In addition, the DR controller 28 may predict an estimated operation time point of a high-power-consumption load. If the estimated operation time point of the high-power-consumption load falls within the low-power-rate assessment interval, the DR controller 28 may start operating the load at the estimated operation time point.

In the meantime, if the estimated operation time point having the high power consumption falls within the high-power-rate assessment interval, the DR controller 28 may move the operation time point of the high-power-consumption load toward a low-power-rate assessment interval located before a high-power-rate assessment interval, and the high-power-consumption load may be pre-operated. Otherwise, the DR controller 28 may move the operation time point of the high-power-consumption load toward a low-power-rate assessment interval located behind the high-power-rate assessment interval, and the high-power-consumption load may be post-operated.

Assuming that the estimated operation time point of a high-power-consumption load falls within the high-power-rate assessment interval, and a high-power-rate assessment interval is maintained until a limit delay time point at which the load operation can be maximally delayed is reached, the DR controller 28 may move the load toward the low-power-rate assessment interval located just before the high-power-rate assessment interval, to perform the pre-operation of the load. In the meantime, assuming that the estimated operation time point of the high-power-consumption load falls within the high-power-rate assessment interval, and the low-power-rate assessment interval is maintained within a limit delay time point at which the load operation can be maximally delayed, the DR controller 28 may move the load toward the low-power-rate assessment interval located just after the high-power-rate assessment interval, to perform the post-operation of the load.

Operations of the DR controller 28 will be described in detail.

Figure 4:
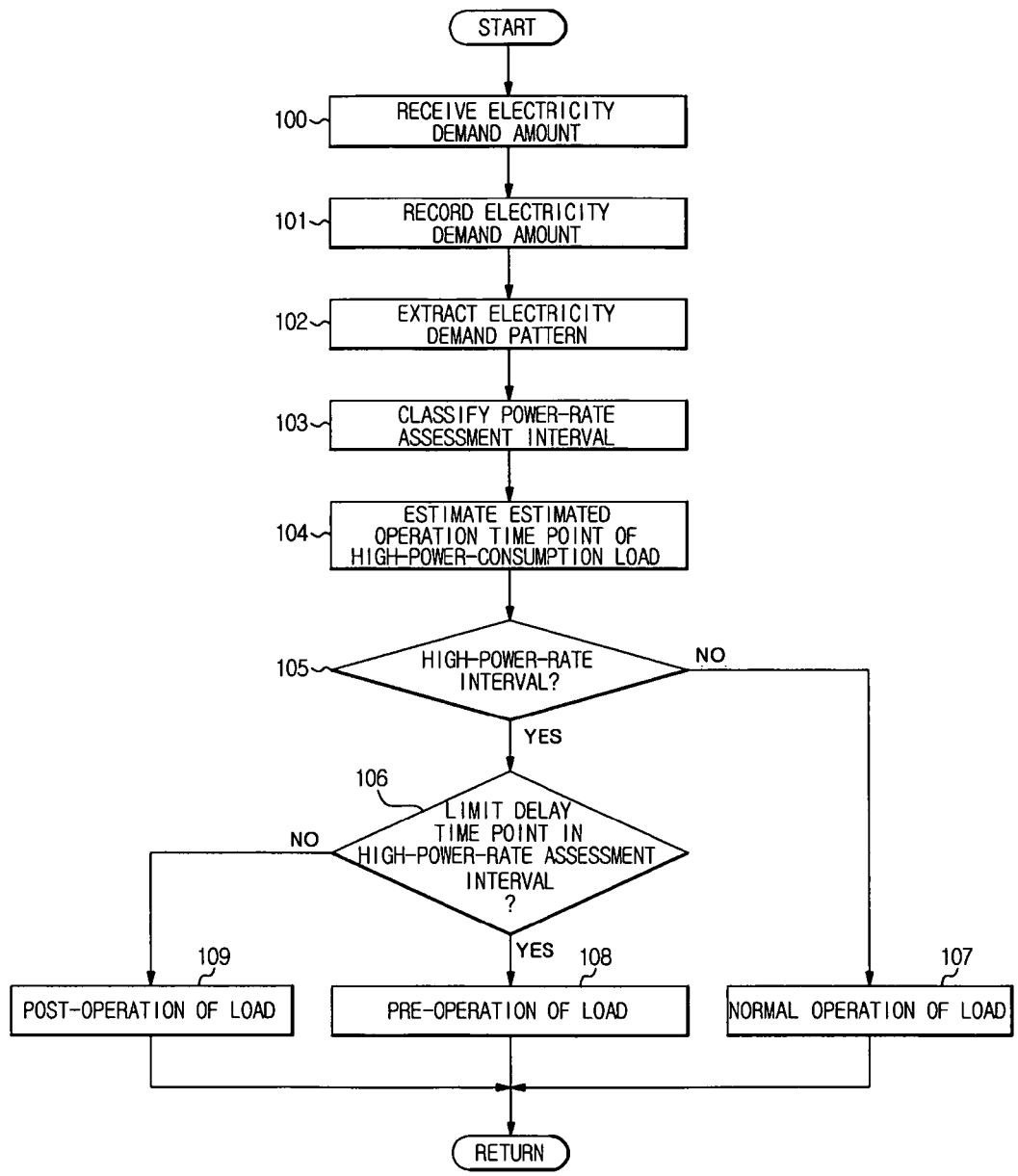
FIG. 4 is a flowchart illustrating a load control method for use in a household appliance using an electricity demand pattern in a DR system according to example embodiments.

FIG. 4 is a flowchart illustrating a load control method for use in a household appliance using an electricity demand pattern in a DR system according to example embodiments.

Referring to FIG. 4, the DR controller 28 may control the receiving unit 22 to receive information about a daily electricity demand amount from the smartmeter 10 at operation 100.

After receiving the information about the electricity demand amount, the DR controller 28 may record the received electricity demand amount information in the electricity demand recording unit 23 at operation 101.

After recording the daily electricity demand amount information, the DR controller 28 may control the electricity demand pattern extracting unit 24 to calculate an average for each time interval during a predetermined time period in association with a daily electricity demand amount recorded in the electricity demand recording unit 23 at operation 102.

After extracting the electricity demand pattern, the DR controller 28 may apply a predetermined electricity demand amount for each time interval classification to the extracted electricity demand pattern, and divide a time interval in response to the electricity demand pattern into a plurality of time zones having different rates at operation 103. In this case, the DR controller 28 may determine one time interval in which the electricity demand amount of the electricity demand pattern is equal to or higher than a predetermined electricity demand amount to be a high-power-rate assessment interval, and determine another time interval in which the electricity demand amount of the electricity demand pattern is less than the predetermined electricity demand amount to be a low-power-rate assessment interval.

The time interval depending on the electricity demand pattern may be classified into a plurality of time intervals having different rates by the DR controller 28. Then, the DR controller 28 may communicate with the household appliance, and estimate an estimated operation time point of a high-power-consumption load from among loads of the household appliance at operation 104.

After estimating the estimated operation time point of the high-power-consumption load, the DR controller 28 may determine whether the estimated operation time point falls within the high-power-rate assessment interval at operation 105.

If the estimated operation time point of the high-power-consumption load does not fall within the high-power-rate assessment interval at operation 105, the DR controller 28 may control the transmitting unit 25 to transmit a control command to a household appliance, wherein the control command may enable the load to operate at a predetermined time point (i.e., a low-power-rate assessment interval), and the load can be normally operated at operation 107. Therefore, the load may be operated at an original operation time point.

Meanwhile, if the estimated operation time point of the high-power-consumption load falls within the high-power-rate assessment interval at operation 105, the DR controller 28 may determine whether a predetermined limit delay time point at which the load operation can be maximally delayed may be contained in the high-power-rate assessment interval at operation 106.

If the limit delay time point of the load falls within the high-power-rate assessment interval at operation 106, the DR controller 28 may control the transmitting unit 25 to transmit a control command to the household appliance, wherein the control command may allow the beginning and completion of the load operation to be carried out in the low-power-rate assessment interval preceding the high-power-rate assessment interval, and the pre-operation of the load may be performed at operation 108. That is, the DR controller 28 may move the beginning point of the load operation toward the low-power-rate assessment interval located before the high-power-rate assessment interval, to perform the pre-operation of the load.

Meanwhile, if the limit delay time point of the load does not fall within the high-power-rate assessment interval at operation 107, the DR controller may transmit a control command to the household appliance through the transmitting unit 25 in such a manner that the load operation may be carried out when the high-power-rate assessment interval is changed to the low-power-rate assessment interval, to perform the post-operation of the load at operation 109. The DR controller may 28 control the beginning point of the load operation to be delayed toward the low-power-rate assessment interval located after the high-power-rate assessment interval, to post-operate the load at operation 109. In this case, the limit delay time point may be pre-determined in consideration of the load operation time.

Through the above-mentioned scheme, a refrigerator or air-conditioner may prevent the defrosting heater operation, which consumes a great deal of power or energy, from being operated in a high-power-rate interval, such that only the low-power-consumption load can be operated in the high-power-rate interval, thereby minimizing power consumption.

In addition, the cooling operation conducted via a compressor of the refrigerator or air-conditioner may be pre-operated before a current time enters a high-power-rate interval, and temperature of the room air may be pre-decreased. Otherwise, the hot-water supplying operation conducted via a heater of a washing machine may be pre-operated before a current time enters the high-power-rate interval, and water may be pre-heated, such that only the low-power-consumption load may be operated in the high-power-rate interval, thereby minimizing power consumption.

Through the above-mentioned scheme, the DR controller may greatly reduce power consumption of the household appliance during a high-power-rate interval, and the power rates or energy costs may be greatly reduced and the limitation in operating the household appliance can be minimized, resulting in considerable reduction in user inconvenience.

Hereinafter, a method of allowing the DR system to adjust the defrosting time point of the refrigerator on the basis of the electricity demand pattern according to the example embodiments will be described in detail.

Figure 5:
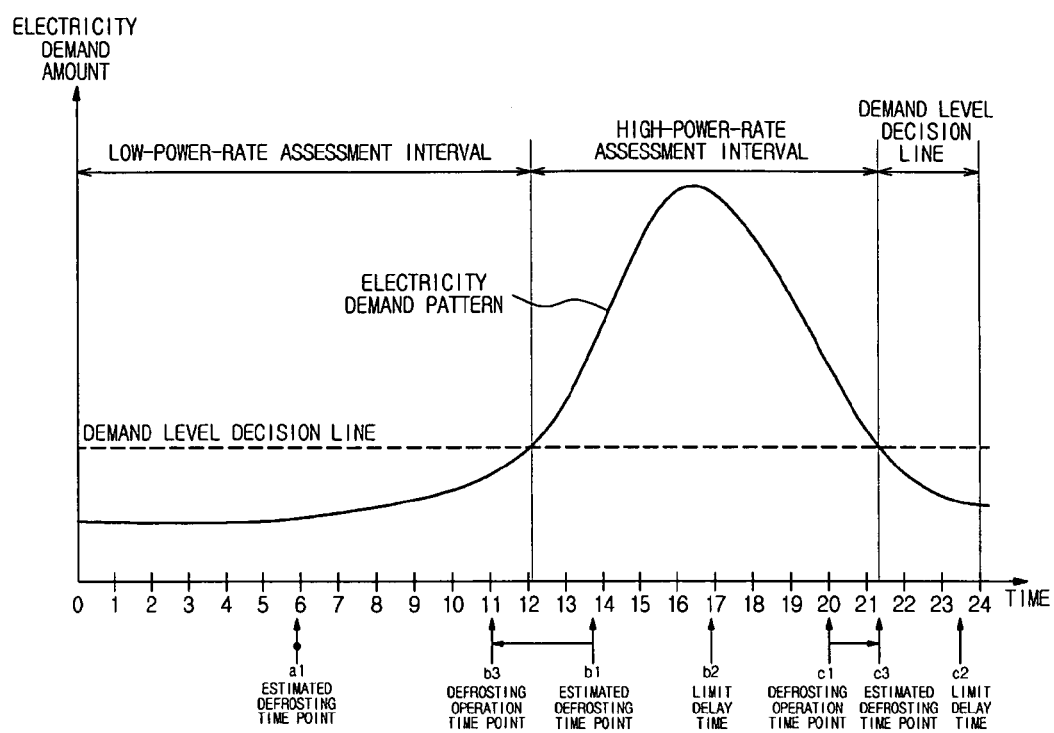
FIG. 5 is a graph illustrating a defrosting control method for a refrigerator using an electricity demand pattern in a DR system according to example embodiments.

FIG. 5 is a graph illustrating a defrosting control method for a refrigerator using an electricity demand pattern in a DR system according to example embodiments.

Referring to FIG. 5, the frost may be formed at an evaporator during the cooling operation of the refrigerator, and it may be necessary for the refrigerator to periodically perform the defrosting operation.

The defrosting operation may be carried out by a heater installed in the refrigerator, and a large amount of power or energy may be consumed during the defrosting operation.

If the defrosting operation is carried out in the remaining intervals other than the high-power-rate interval using the electricity demand pattern, the power rates or energy costs may be greatly reduced.

As can be seen from FIG. 5, the time interval depending on the electricity demand pattern may be classified into a high-power-rate assessment interval and a low-power-rate assessment interval according to a predetermined demand level decision line.

First, the DR controller 28 may estimate the start point of the operation of the high-power-consumption load by communicating with the corresponding household appliance.

If the estimated operation time point of the load falls within the low-power-rate assessment interval as denoted by a time point "a1", the DR controller 28 may start operating the load at the time point "a1."

Meanwhile, if the estimated operation time point of the load falls within the high-power-rate assessment interval as denoted by a time point "b1" and the high-power-rate assessment interval is kept to a time point "b2", beyond which the load operation cannot be delayed, the operation time point of the load is shifted to a time point "b3" within the low-power-rate assessment interval located before the high-power-rate assessment interval, and the load pre-operation is performed.

If the estimated operation time point of the load falls within the high-power-rate assessment interval as denoted by a time point "c1" and the low-power-rate assessment interval is maintained within a time point "c2" at which the load operation can be maximally delayed, the operation time point of the load may be delayed to a time point "c3" contained in the low-power-rate assessment interval located after the high-power-rate assessment interval, and the load is post-operated.

Figure 6:
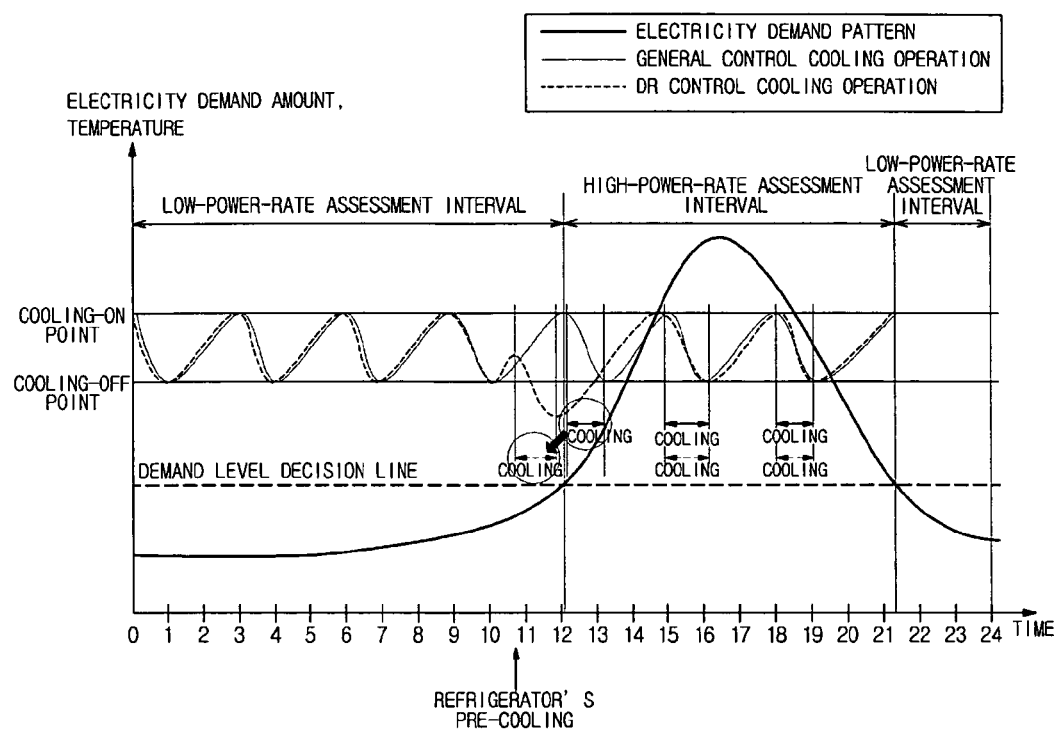
FIG. 6 is a graph illustrating a pre-cooling control method for a refrigerator using an electricity demand pattern in a DR system according to example embodiments.

FIG. 6 is a graph illustrating a pre-cooling control method for a refrigerator using an electricity demand pattern in a DR system according to example embodiments.

Referring to FIG. 6, the DR system may pre-control the cooling operation at a low temperature prior to the increasing of the electricity demand, and then maintain the stationary status when the electricity demand is high.

According to the aforementioned control, the DR system may prevent a first cooling operation from being performed in the high-power-rate assessment interval.

Figure 7:
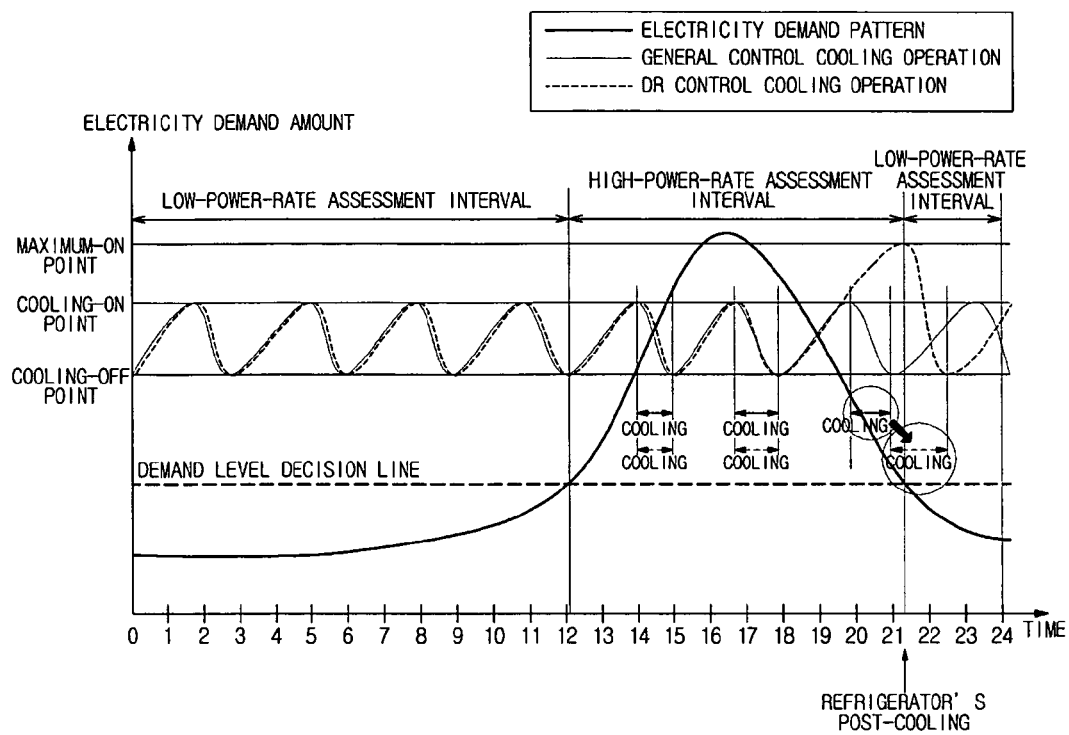
FIG. 7 is a graph illustrating a post-cooling control method for a refrigerator using an electricity demand pattern in a DR system according to example embodiments.

FIG. 7 is a graph illustrating a post-cooling control method for a refrigerator using an electricity demand pattern in a DR system according to example embodiments.

Referring to FIG. 7, the DR system may delay the cooling operation of one cycle prior to the decreasing of the electricity demand using the electricity demand pattern, and perform the cooling operation when the electricity demand is decreased.

Provided that the inner temperature of the refrigerator is increased during the delay operation, the increased inner temperature may affect the quality, and a maximum ON temperature may be established. During the delay operation, if the temperature is increased to the maximum ON temperature or higher, the cooling operation may be immediately performed.

According to the aforementioned control, the DR system may prevent the last cooling operation from being performed in the high-power-rate assessment interval.

As a failsafe against communication connection interruption between the DR controller 20 and each household appliance 30, 40 or 50, the electricity demand pattern stored in the DR controller 20 may be pre-stored in each household appliance 30, 40 or 50. In this case, each household appliance 30, 40 or 50 may perform the load delay operation on the basis of the electricity demand pattern stored in each household appliance 30, 40 or 50.

Figure 8:
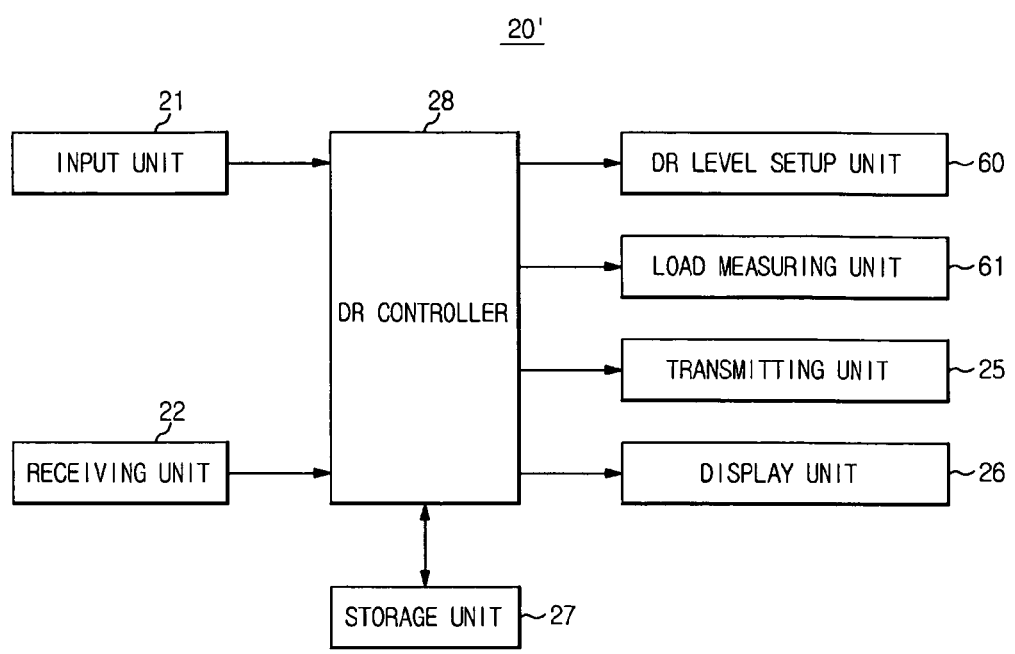
FIG. 8 is a control block diagram illustrating a DR controller for use in a DR system according to example embodiments.

FIG. 8 is a control block diagram illustrating a DR controller for use in a DR system according to example embodiments.

Referring to FIG. 8, the DR controller 20 of the DR system according to example embodiments may include an input unit 21, a receiving unit 22, a DR level setup unit 60, a load measuring unit 61, a transmitting unit 25, a display unit 26, and a storage unit 27.

The input unit 21 may be used as an interface unit to allow a user to enter a desired command, and may be for example, a keypad, a keyboard, a joystick, a touchpad, a button, etc.

The receiving unit 22 may receive power rate information from the smartmeter 10, and receive various kinds of information from each household appliance 30, 40 or 50 installed in a home.

The DR level setup unit 60 may establish a plurality of DR levels having different amounts of power on the basis of power rate information received from the smartmeter 10. For example, the DR level setup unit 60 may establish four DR levels having different power rates and different amounts of power on the basis of a minimum power rate and a maximum power rate.

The load measuring unit 61 may measure the amount of power consumed in each household appliance installed in a home at intervals of a predetermined time.

The transmitting unit 35 may transmit various kinds of information to the individual household appliances 30, 40 and 50.

The display unit 26 may visually indicate operations of the DR control unit 20, or may display a DR level in response to the power rate.

The storage unit 27 may store DR level information or various kinds of information associated with the DR control unit 20. In addition, the storage unit 27 may store priority, quality influence, maximum delay time, delay standby time, and power consumption of respective loads of a household appliance (See FIG. 9).

The DR controller 28 may receive power rate information from the smartmeter 10 through the receiving unit 22, and establish a plurality of DR levels having different amounts of power and different allowed amounts of power on the basis of a minimum power rate and a maximum power rate of the power rate information through the DR level setup unit 60.

The DR controller 28 may recognize a current DR level form among DR levels established by the DR level setup unit 60, and measure a current amount of power consumed by the household appliance through the load measuring unit 61.

In addition, the DR controller 28 may compare a current measured amount of power with an allowed amount of power corresponding to the current DR level. If the measured amount of power is equal to or higher than the allowed amount of power corresponding to the current DR level, the DR controller 28 may delay the operation of respective loads in descending numerical order of priorities until a current amount of power reaches an allowed amount of power corresponding to the current DR level. If the current amount of power is less than the allowed amount of power corresponding to the current DR level, the DR controller 28 may normally operate the respective loads in predetermined operation orders.

Figure 10:
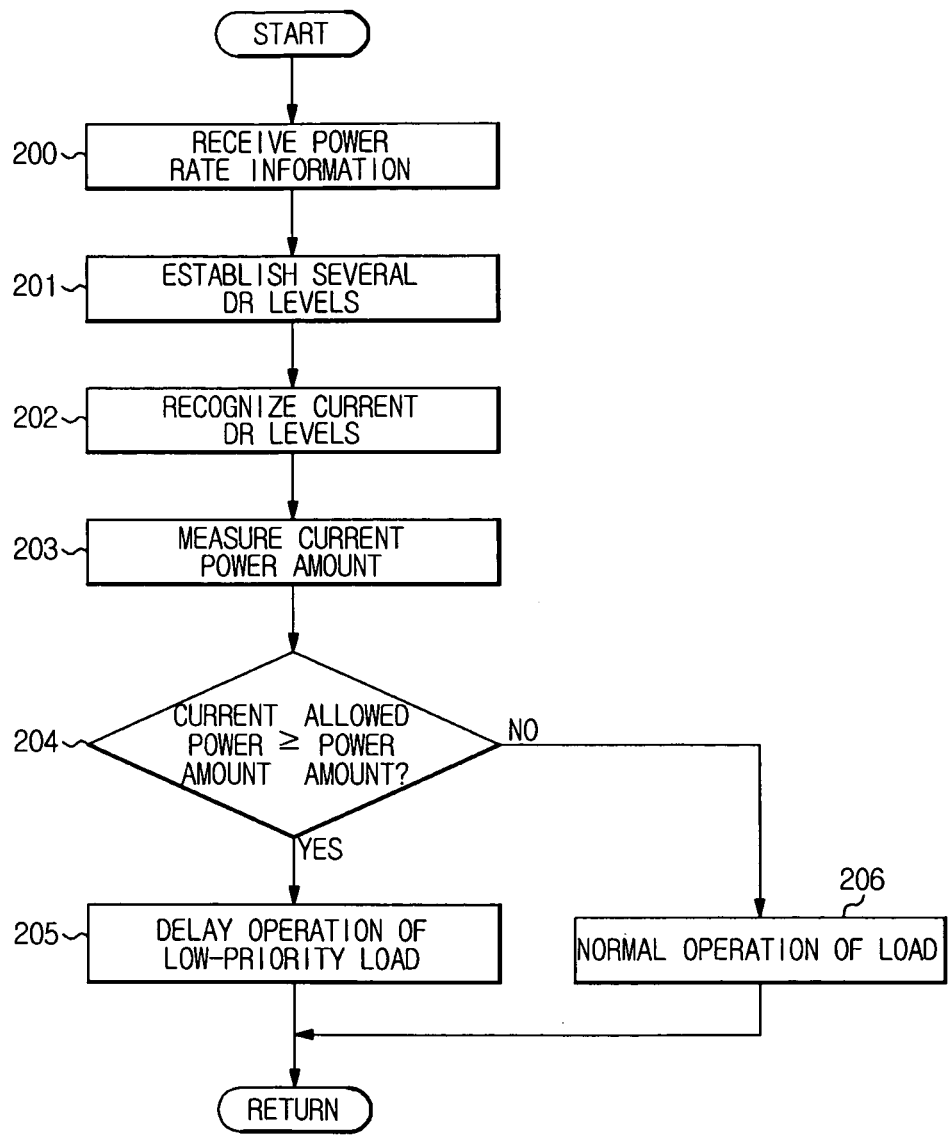
FIG. 10 is a flowchart illustrating a method of delaying the operation of each load in such a manner that a demand response (DR) system controls the amount of power used by a household appliance within an allowed amount of power in response to a current DR level according to example embodiments.

FIG. 10 is a flowchart illustrating a method of delaying the operation of each load in such a manner that a DR system controls the amount of power used by a household appliance within an allowed amount of power in response to a current DR level according to example embodiments.

Referring to FIG. 10, the DR controller 28 may receive power rate information from the smartmeter 10 through the receiving unit 22 at operation 200.

After receiving the power rate information, the DR controller 28 may establish a plurality of DR levels through the DR level setup unit 60 at operation 201. For example, the DR level may have four levels (i.e., first to fourth DR levels), and have different power rates and different allowed amounts of power. As the DR level is gradually increased, the power rate to be assessed may be gradually increased and established.

After establishing the DR level, the DR controller 28 may recognize a current DR level of the household appliance at operation 202.

After recognizing the current DR level, the DR controller 28 may measure a current amount of power per unit time of the household appliance through the load measuring unit 61 at operation 203.

After measuring the current amount of power per unit time of the household appliance, the DR controller 28 may compare the measured amount of power with the allowed amount of power corresponding to the current DR level, and determine whether the current measured amount of power is equal to or higher than the allowed amount of power corresponding to the current DR level at operation 204.

If the current amount of power is equal to or higher than the allowed amount of power corresponding to the current DR level at operation 204, the DR controller 28 may delay the operation of respective loads in ascending numerical order of priorities until the current amount of power reaches the allowed amount of power corresponding to the current DR level at operation 205. In this case, the operation time point of the load may be delayed and the low-priority load may be operated in an interval of a low DR level.

Meanwhile, if the current power amount is less than the allowed power amount corresponding to the current DR level, the DR controller 28 may normally operate the respective loads in predetermined operation orders at operation 206.

For reference, the DR controller 28 may determine whether the current amount of power per unit time is higher than the allowed amount of power or there is a high possibility that current amount of power per unit time is higher than the allowed amount of power. If the current amount of power per unit time is higher than the allowed amount of power, the DR controller 28 may delay the operation of each load in ascending numerical order.

According to the above-mentioned scheme, the DR system may guarantee the load operation quality and reduce the amount of power consumption during a high-DR-level interval, resulting in reduction of power rates.

Figure 11:
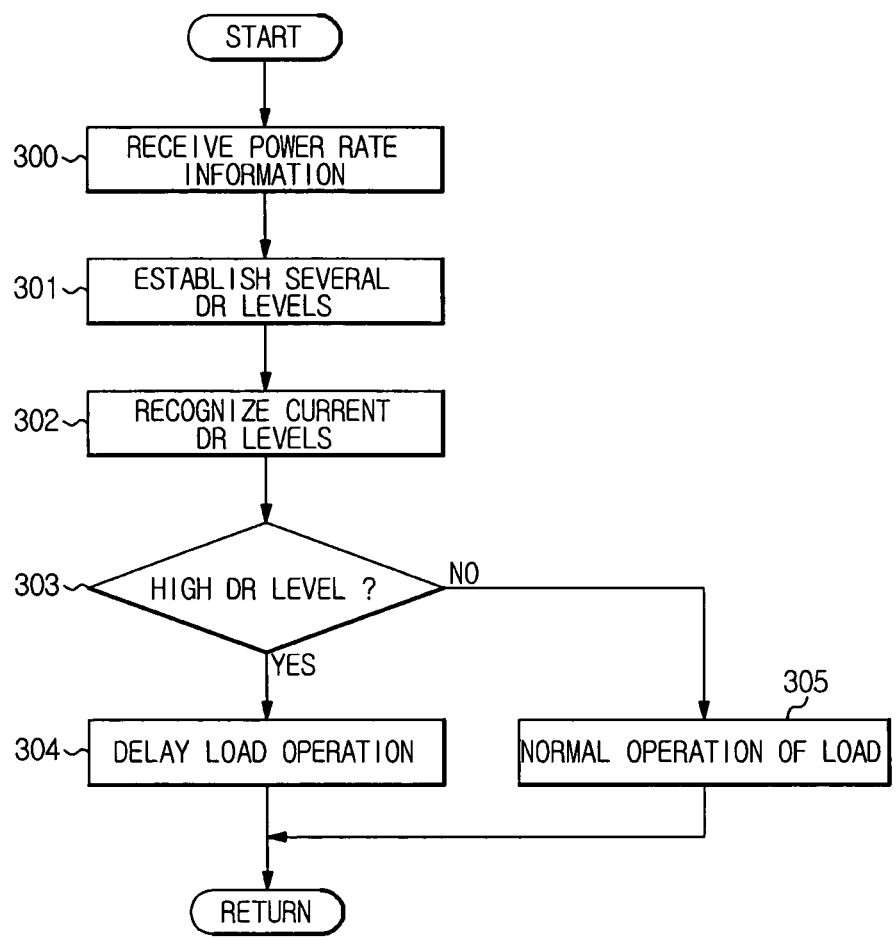
FIG. 11 is a flowchart illustrating a method of delaying the operation of each load of a household appliance in response to a current DR level in a DR system according to example embodiments.

FIG. 11 is a flowchart illustrating a method of delaying the operation of each load of a household appliance in response to a current DR level in a DR system according to example embodiments.

Referring to FIG. 11, the DR controller 28 may receive power rate information from the smartmeter 10 through the receiving unit 22 at operation 300.

After receiving the power rate information, the DR controller 28 may establish a plurality of DR levels through the DR level setup unit 60 at operation 301. For example, the DR level may have four levels (i.e., first to fourth DR levels), and have different power rates and different allowed amounts of power. As the DR level is gradually increased, the power rate to be assessed may be gradually increased and established.

After establishing the DR level, the DR controller 28 may recognize a current DR level of the household appliance at operation 302.

After recognizing the current DR level, the DR controller 28 may compare the recognized current DR level with a predetermined DR level, and determine whether the current DR level is high in level at operation 303. For example, if the DR level is a third DR level or a fourth DR level, this means that the current DR level is high.

If the current DR level is high at operation 303, the DR controller 28 may delay the operation of a high-power-consumption load at operation 304.

Otherwise, if the current DR level is not high at operation 303, the DR controller may normally operate the load at operation 305.

According to the above-mentioned examples, the DR system may shift the start time point of the defrosting operation of a refrigerator from a high-DR-level interval to a low-DR-level interval, and may reduce power consumption during the high-DR-level interval, thereby reducing power rates.

As is apparent from the above description, the DR system, computer-readable medium and method according to the example embodiments may operate a high-power-consumption load with a positive or negative initiation delay in a low-power-rate interval according to the electricity demand pattern, and may smooth a power peak point and reduce a power rate in case of a real-time power rate system.

In addition, the DR system, computer-readable medium and method according to the example embodiments controls a high-power-consumption load to be pre-operated or post-operated in a low-power-rate interval according to the electricity demand pattern, and may consider unique characteristics and driving histories of household appliances and reflect a user's personality in the design of household appliances.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although example embodiments have been shown and described, it should be appreciated by those skilled in the art that changes may be made in these embodiments without departing from the principles and spirit of the disclosure, the scope of which is defined in the claims and their equivalents.

What is claimed is:
1. A demand response method, comprising:
receiving, by a computer, electricity demand information;
extracting, by the computer, an electricity demand pattern in response to the received electricity demand information;
dividing, by the computer, a unit interval into a high-power-rate interval and a low-power-rate interval in response to the extracted electricity demand pattern;
estimating, by the computer, an estimated operation time point of a load; and
changing, by the computer, if the estimated operation time point is in the high-power-rate interval, an operation time point of the load to any time of the low-power-rate interval to operate the load in the low-power-rate interval,
wherein the changing of the operation time of the load to any time of the low-power-rate interval includes determining, if the estimated operation time point is in the high-power-rate interval, whether a limit delay time point at which the load operation is maximally delayed falls within the high-power-rate interval.

2. The method according to claim 1, wherein, in the estimating of the estimated operation time point of the load, the load is a high-power-consumption load.

3. The method according to claim 2, wherein the load is any one of a defrosting heater of a refrigerator, a defrosting heater of an air-conditioner, or a heater of a washing machine.

4. The method according to claim 1 or 3, wherein the changing of the operation time of the load to any time of the low-power-rate interval further includes:
performing a pre-operation for moving the operation time point of the load forward or a post-operation for moving the operation time point of the load backward according to the determined result to allow the operation time point of the load to move from the high-power-rate interval.

5. The method according to claim 4, wherein one of the performing of the pre-operation and the post-operation includes:
if a limit delay time point of the load falls within the high-power-rate interval, shifting the operation time point of the load to the low-power-rate interval located before the high-power-rate interval, and
if the limit delay time point of the load does not fall within the high-power-rate interval, delaying the operation time point of the load toward a low-power-rate interval located after the high-power-rate interval.

6. A demand response method, comprising:
receiving, by a computer, electricity demand information;
extracting, by the computer, an electricity demand pattern in response to the received electricity demand information;
dividing, by the computer, a unit interval into a high-power-rate interval and a low-power-rate interval in response to the extracted electricity demand pattern; and
performing, by the computer, at least one of a pre-cooling operation wherein a household appliance starts a cooling operation in a low-power-rate interval before the high-power-rate interval, or a post-cooling operation wherein a start time of a final-cycle cooling operation performed in the high-power-rate interval is delayed to a low-power-rate interval located after the high-power-rate interval.

7. The method according to claim 6, wherein, in the performing of the pre-cooling operation, the pre-cooling operation is compulsorily cooled to a specific temperature lower than a predetermined temperature of a previous-cycle cooling operation.

8. A demand response system, comprising:
a receiving unit to receive electricity demand information;
an electricity demand recording unit to record information an electricity demand amount in response to the received electricity demand information;
an electricity demand pattern extracting unit to extract an electricity demand pattern from the electricity demand amount recorded in the electricity demand recording unit; and
a demand response (DR) controller to compare an electricity demand amount of an electricity demand pattern extracted from the electricity demand pattern extracting unit with a predetermined electricity demand amount, divide a unit interval into a high-power-rate interval and a low-power-rate interval, estimate an estimated operation time point of a load, and shift a start time point of the load operation to the low-power-rate interval when the estimated operation time point falls within the high-power-rate interval to start the load operation in the low-power-rate interval, wherein the DR controller determines, if the estimated operation time point falls within the high-power-rate interval, whether a limit delay time point at which the load operation is maximally delayed falls within the high-power-rate interval.

9. The system according to claim 8, wherein the load is any one of a defrosting heater of a refrigerator, a defrosting heater of an air-conditioner, or a heater of a washing machine.

10. The system according to any one of claim 8 or 9, wherein the DR controller moves the operation time point of the load toward the low-power-rate interval located before the high-power-rate interval when the limit delay time point of the load falls within the high-power-rate interval, and delays the operation time point of the load toward a low-power-rate interval located after the high-power-rate interval when the limit delay time point of the load does not fall within the high-power-rate interval.

11. A method, comprising:
interpreting, by a computer, electricity demand information to generate an electricity demand pattern;
determining, by the computer, demand rate levels to generate a high power rate time period and a low power rate time period by using the electricity demand pattern; and
modifying, by the computer, an electrical appliance operation time forward or backward in time to the low power rate time period if the electrical appliance operation time is preset in the high power rate time period, where the modifying is dependent upon at least one of a maximum delay time, a priority of an electrical appliance and an influence on quality.

12. At least one non-transitory computer readable medium comprising computer readable instructions that control at least one processor to implement the method of claim 11.

* * * * *